March 27, 1934.  G. B. CROUSE ET AL  1,952,974
VOLTAGE REGULATOR
Original Filed Sept. 8, 1926
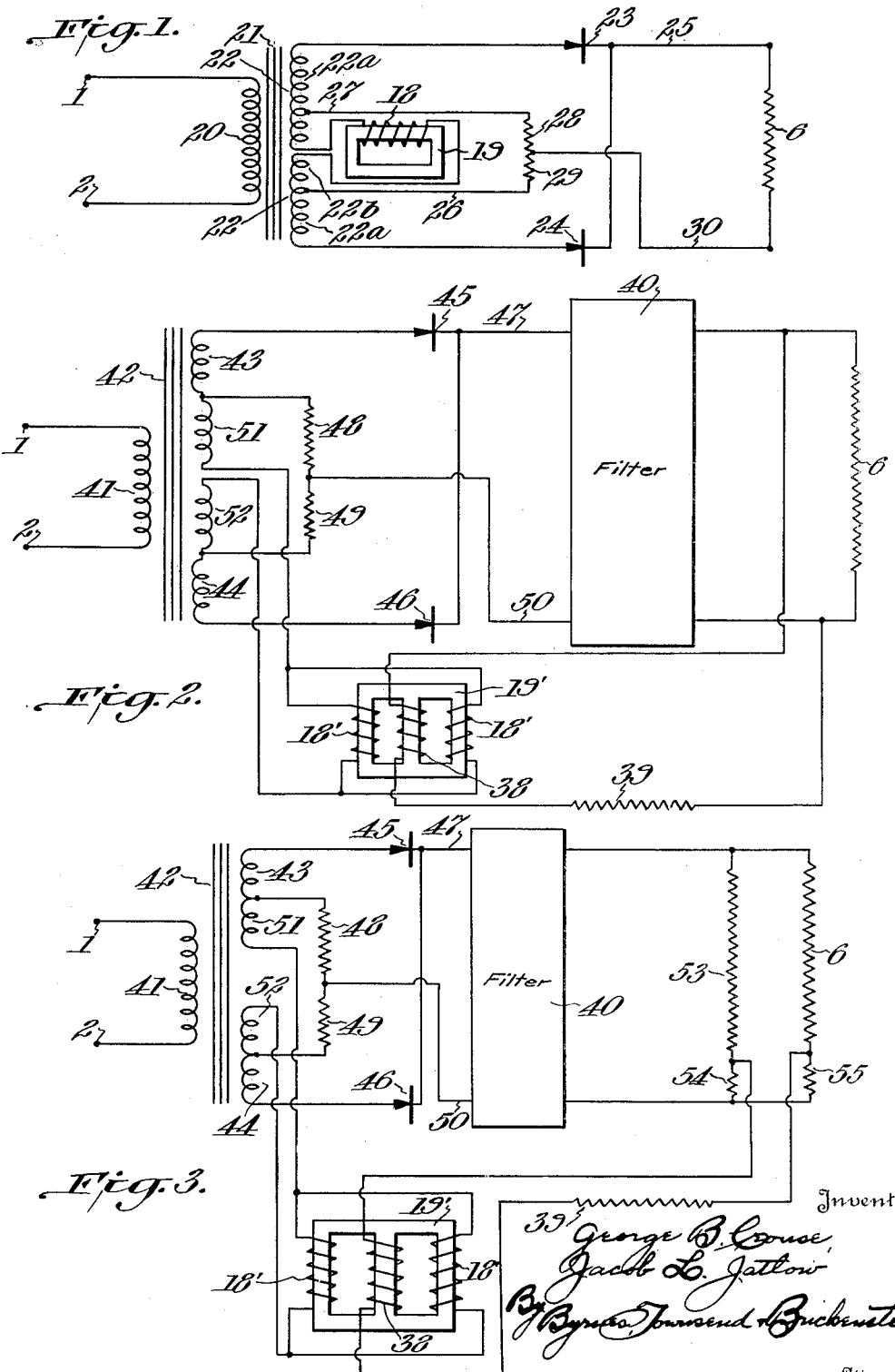

Patented Mar. 27, 1934

1,952,974

UNITED STATES PATENT OFFICE 1,952,974

VOLTAGE REGULATOR

George B. Crouse, Woodcliff, and Jacob L. Jatlow, Elizabeth, N. J., assignors, by mesne assignments, to Potter, Pierce and Scheffler, a firm consisting of Charles H. Potter, James F. Pierce, and Richard L. Scheffler, Washington, D. C.

Original application September 8, 1926, Serial No. 134,249. Divided and this application September 15, 1926, Serial No. 135,692. Renewed July 12, 1933

13 Claims. (Cl. 175—363)

This invention relates to voltage regulators and more particularly to automatic regulators for controlling the voltage impressed upon a load line under variations in an electrical condition which tends to alter the voltage across the load.

The invention is particularly useful in effecting a control of the output voltage of an electrical converter. The control is usually designed to maintain the output voltage constant, but this is not essential as the design may be such that the voltage across the load varies in the same sense or in a sense opposite to that which would normally accompany a change in the critical electrical condition upon which the regulation is based. In supplying current to a load from a source of energy and through an electrical converter, the particular electrical condition which determines the regulation may be the input voltage, the voltage across the load itself, or the value of the load.

In accordance with this invention, the desired regulation is effected by passing current from the source or from the load line through a regulating resistance, and controlling the effect of the resistance upon that current by simultaneously subjecting the resistance to the influence of an additional current, which additional current may pass through the regulating resistance or through a separate resistance thermally coupled thereto. The regulating resistance may be formed of material having a negligible or a high temperature-resistance coefficient, and in the preferred embodiments of the invention the resistance is free from mechanically movable parts and electric make-and-break contacts. When the resistance is formed of material having a negligible temperature-resistance coefficient, it is of the type commonly designated a "fixed resistance". Since this term would be misleading when applied to a resistance whose value varies with temperature changes, the term "static resistance" is employed in the following specification and claims to designate a resistance which is free from moving parts or make-and-break contacts, but which may or may not be formed of such material that its effective value varies with temperature changes.

This application is a division of our copending application, Serial Number 134,249, filed Sept. 8, 1926, which application includes a description of and generic claims to the present invention. The claims of this application are restricted to methods and apparatus which are excluded by the terms of the specific claims of our copending application.

An object of the invention is to provide a method of and apparatus for regulating the voltage across a line by passing the load line current, or a part thereof, through a resistance of substantially constant value, and controlling the effect of such resistance upon the load line voltage by passing an additional current through the resistance. More specifically, an object is to provide a method of and apparatus for regulating the voltage impressed upon a load line by a source of energy, by including a static resistance of substantially constant value in the circuit of the load line, and controlling the effect of such resistance upon the load line voltage by passing through the resistance an additional current which varies in accordance with variations of the source voltage.

These and other objects of the invention will be apparent from the following specification when taken with the accompanying drawing in which:

Fig. 1 is a circuit diagram of apparatus for effecting the control from the source voltage;

Fig. 2 is a circuit diagram of apparatus in which the control is dependent upon the voltage across the load; and Fig. 3 is a circuit diagram of apparatus in which the control is dependent upon the load resistance.

In the diagrams, the invention is illustrated as embodied in converters of the double-wave rectifier type.

In Fig. 1 the reference numerals 1 and 2 represent the terminals of an alternating current supply system connected to the primary 20 of a transformer which has a core 21 and two secondary windings 22. The outer terminals of the secondary windings 22 are each connected to rectifiers 23 and 24, the free terminals of the rectifiers being joined together to form, say, the positive wire 25. Connected to intermediate terminals of the secondary 22 are the wires 26 and 27 which divide the respective secondary windings 22 into outer sections 22a and intermediate sections 22b, the sections 22b being connected through the coil 18 which is wound on a core 19. The leads 26 and 27 extend to opposite sides of a resistance 28, 29 and the center point of the resistance is connected to the wire 30 which forms the negative output lead of the system. The load 6 is then connected between the wires 25 and 30. The resistances 28 and 29 may be formed of a material having a high resistance-temperature coefficient, or of such material that the resistance is of substantially constant value. When the resistances 28 and 29 are of such material that they have a high temperature-resistance coefficient, one effect of a variation in source voltage is to change their effective value, since an increase in source voltage will result in a greater flow of current through the regulating windings and therefore an increase in the temperature of the resistances 28, 29. By a suitable design of coil 18 and core 19, a relatively small change in the voltage induced in windings 22b will cause a large variation in the regulating current supplied to the resistances. The coil 18 therefore permits economy in power and greater latitude in design, but it is not an essential element when the resistances are of the temperature-variant type. As the static resistance is a series element of the direct current load circuit, an increase in its value causes a lesser portion of the increased direct current voltage to be passed to the load 6. The regulating effect is not due solely, however, to the change in resistance of the members 28, 29, but is modified by the fact that the voltage impressed upon the rectifiers is supplied in part by the intermediate winding 22b. The effective voltage as well as the current supplied by the regulating winding therefore affects the voltage across the load. The modifying action of the voltage drop may best be understood by first analyzing the operation of the circuit as constructed with resistance elements 28, 29, which are of substantially constant value.

The effective alternating current voltage applied to a given rectifier, for instance, the rectifier 23, consists of two parts, one applied from the upper winding 22a and the other arising from the voltage drop across the resistance 28 due to the intermediate winding 22b. The voltages set up across the terminals of the windings 22a, 22b, are dependent upon the source of voltage and will both vary in the same sense and at the same rate with changes in the source voltage. By a proper design of the elements the effect of a change in the voltage across the windings 22a may be compensated, in whole or in part, by the change in the voltage drop across the resistance 28 which results from the simultaneous change in voltage induced in the windings 22b, as modified by the coil 18. When it is desired to make use of the action just described, the use of the inductance 18 is essential, as otherwise the drop across the resistance would be a constant proportion of the source voltage. In the foregoing explanation the difference in phase between the voltage of the winding 22a and that impressed across the resistance 28 by the winding 22b is not taken into account. This phase difference must be considered in the structural design of a system, but does not affect the validity of the above explanation of operation.

Returning to a consideration of the operation of the system when the elements 28 and 29 are formed of material having a high temperature-resistance coefficient, it will be apparent that the effective voltage drop to which current from the winding 22a is subjected on passage through the resistance 28 is dependent both upon the magnitude of the regulating current originating in the winding 22b and upon the voltage drop to which that current is subjected on passing through the resistance. Both of these factors must be considered in the structural design and their separate effects may be either aiding or opposing with respect to each other.

The circuit of Fig. 2 illustrates an embodiment of the invention which is similar to that shown in Fig. 1, but differs from that embodiment by including elements for effecting a regulation from the output side of the converter. In this circuit the numerals 1 and 2 indicate the terminals of an alternating current supply line across which the transformer primary 41 is connected. The transformer has a core 42 and a pair of secondary windings 43, 44, for supplying current to the rectifiers 45, 46, respectively. Like terminals of the rectifiers 45, 46 are connected to each other and to one side 47 of the direct current load line, the other rectifier terminals being connected to a terminal of the respective secondary windings 43 and 44. The other terminals of secondaries 43, 44 are connected to each other through a series resistance comprising sections 48, 49 whose junction point serves as the terminal for the other side 50 of the load line. The static resistance 48, 49 may be of substantially constant value or its value may vary with its temperature. The winding for impressing a regulating voltage across the static resistance is preferably formed in two sections 51, 52, whose outer ends are joined to those terminals of the windings 43, 44 which are connected to the static resistance. The inner ends of the sections 51, 52 of the regulating secondary are connected through a series inductance comprising the two oppositely wound coils 18' on the outer legs of the three-legged core 19'. To control the reactance of the inductance 18', the magnetic saturation of the iron core 19' is controlled by means of a coil 38 which is wound on the inner leg of the core and is connected in parallel with the load 6 through a series resistance 39. By properly proportioning the various elements of the regulating circuit a very small increase of voltage across the load 6 will be sufficient to effect a large increase of current flowing through the regulating circuit. The control is dependent upon a change in the voltage across the load and therefore only approximately constant voltage across the load can be secured, but the relative amount of the variation may be reduced to any desired degree by a suitable design of the parts.

Although not limited in its application to a supply system for delivering a substantially ripple-free current from an alternating current source the invention is particularly adapted for such use. A filter 40 of any desired type may be included in the load line between the converter and the load 6. The resistance 39 must permit the passage of sufficient current to effect the desired regulation, but is preferably of such relatively high value that the amount of direct current required by the voltage regulator will be small as compared to the current passed over the load. The two sections of the inductance 18' are so proportioned that no alternating current potential will be introduced to the load circuit through the coil 38.

The operation of the circuit of Fig. 2 is similar to that of Fig. 1 so far as the static resistance is concerned. The regulating current is derived from the source through windings 22b and is controlled in magnitude by the coil 18' whose effective reactance varies with changes in the direct current flowing in coil 38.

The circuit of Fig. 2 effects a regulation based upon slight variations in the voltage across the load. The regulation of the line voltage may be made dependent upon the value of the load resistance by including the load as one arm of a bridge circuit.

Many of the elements of a circuit for effecting regulation by fluctuations in the magnitude of the load may be practically identical with the corresponding elements of a circuit in which the regulation is based on variations of the voltage across the load. The circuit of Fig. 3 differs from that of Fig. 2 as to the connections between the control winding 38 and the load line. The load line and the control winding 38 are arranged as the cross-arms of a bridge which is formed by the load 6 and the impedances 53, 54 and 55. The resistance 55 should be of comparatively low value and of the same current carrying capacity as the load 6. The resistances 53 and 54 should preferably be of high resistance in comparison with the load 6 and resistance 55, and may be of smaller current carrying capacity.

It will be noted that the circuits of Figs. 2 and 3 differ as to the relative sense of the windings 43, 44 and the windings 51, 52 of the regulating circuit. As shown in Fig. 2, the sets of secondary windings are opposed and in Fig. 3 the secondaries are all wound in the same sense. The relative sense of the windings must be considered in the design of the circuit elements, but either the opposed or aiding windings may be used in a particular circuit.

When the load line secondary 43 and the regulating secondary 51 are wound in the same sense, the bridge in which the load 6 is included should be so arranged that a decrease in the load resistance will cause an increase of direct current to flow in the control winding 38. This increase of current will change the magnetic saturation of the core 19', a greater alternating current will therefore be allowed to pass from winding 51 to the resistance 48, a larger regulating potential drop across this element will be applied to aid the voltage of the secondary 43, and thus an increase in voltage across the load line 47, 50 will result. By a proper design of the various elements the voltage across the load may be kept constant as the line voltage changes in accordance with fluctuations in the load resistance. This system of regulation does not correct for variations in the source voltage.

While the above explanation has been directed to only one-half of the rectifier system, it will be apparent that the same effect takes place across the other half. As previously stated, the voltages of the coils 43, 44 will not be in phase with the voltages established in the resistance 48, 49 by the regulating windings and this difference in phase should be taken into account in the design of a particular regulating system. The design of the parts will also be dependent upon the temperature-resistance characteristics of the static resistance elements.

It is to be noted that the voltage regulation may be obtained without the use of mechanically movable parts or electric make-and-break devices. It will be obvious that while certain elements may be moved for effecting a preliminary or occasional adjustment of a particular system, the actual regulation for variations in a critical electrical condition will take place automatically when the parts are suitably designed to effect that result.

It is to be understood however that while the invention may be embodied in an automatic regulator, manually operated switches or other devices may be used in connection with or as substitutes for the elements which effect the automatic regulation. So far as applicants are aware, it is broadly new to effect voltage regulation by introducing a resistance of substantially constant value as an element of the circuit in which regulation is desired, and controlling the effect of that resistance upon the voltage of the circuit by a regulating circuit in shunt to the resistance and coupled with the source of current supply for the circuit in which regulation is desired.

The several circuits described herein indicate the manner in which the invention may be practiced but it is apparent that the invention is not limited to these illustrative circuits.

We claim:

1. In an electrical system, a source of energy, a load line, a converter, circuit elements including a series resistance of substantially constant value for passing current from said converter to said load line, and a regulating circuit coupled with said source and shunted across said resistance for applying thereto a voltage to directly effect regulation by the potential drop across said resistance.

2. In an electrical system, a source of alternating current, an asymmetric conductor, a fixed resistance of substantially constant value and a load serially arranged in a circuit, and an additional circuit shunted across said resistance for impressing a regulating voltage thereon.

3. The invention as set forth in claim 2, wherein said additional circuit is so coupled to said source that the voltage induced therein is proportional to the voltage of said source.

4. An electrical converter for supplying current to a load line from a source of alternating current, said converter comprising a transformer having a primary winding for connection across said source and a secondary winding for energizing a load line, a resistance of substantially constant value in series with said secondary winding, and an additional secondary winding on said transformer and connected across said resistance to supply a regulating voltage thereto, the circuit of said additional winding being so constructed and arranged that the regulating voltage impressed across said resistance varies with changes in an electrical condition which tend to alter the voltage across the load.

5. The invention as set forth in claim 4, wherein said circuit is so constructed and arranged that the voltage established thereby across said resistance is proportional to the source voltage.

6. In an electrical system for supplying a direct current load line from an alternating current source, a transformer having a primary winding for connection across said source and a plurality of secondary windings, a pair of said secondary windings having a terminal in common, a resistance of substantially constant value connected to said common terminal, a rectifier, a load circuit completed through one of said pair of windings, said rectifier and said resistance, and a regulating circuit effective to control the voltage in said first circuit, said regulating circuit including said resistance and the second of said pair of windings.

7. In an electrical system for supplying a direct current load line from an alternating current source, a transformer having a primary winding for connection across said source and a pair of secondary windings, a resistance of substantially constant value, a pair of rectifiers, said pair of secondary windings having a terminal of each connected through said resistance, and having their other terminals connected through said rectifiers, said rectifiers being oppositely arranged and serially connected, whereby an intermediate point of said resistance and the junction of said rectifiers serve as terminals for a direct current load line, and means additional to said pair of secondary windings for impressing a regulating voltage across said resistance.

8. The invention as set forth in claim 7, wherein said means comprises an additional secondary winding having its terminals connected to those terminals of said pair of secondary windings which are connected through said resistance.

9. The invention as set forth in claim 7, wherein said means comprises an additional secondary winding having its terminals connected to those terminals of said pair of secondary windings which are connected through said resistance, said means being so constructed and arranged that the regulating voltage established thereby across said resistance varies as the voltage of said source.

10. In an electrical system, a source of energy, a load line and a resistance of substantially constant value serially arranged in a circuit, an additional circuit shunted across said resistance for applying thereto a regulating voltage and means in the regulating circuit for causing small variations in the voltage to be regulated to cause relatively large variations of regulating current in the resistance.

11. In an electrical system, a source of energy, a load line, a converter, circuit elements including a series resistance of substantially constant value for passing current from said converter to said load line, a regulating circuit coupled with said source and shunted across said resistance, and means in the regulating circuit for causing small variations in the voltage to be regulated to cause relatively large variations of regulating current in the resistance.

12. In an electrical system, a source of alternating current, an asymmetric conductor, a fixed resistance of substantially constant value and a load serially arranged in a circuit, an additional circuit shunted across said resistance for impressing a regulating voltage thereon and means in the regulating circuit for causing small variations in the voltage to be regulated to cause relatively large variations of regulating current in the resistance.

13. In an electrical system, a source of energy, a load line, a converter, circuit elements including a series resistance of substantially constant value for passing current from said converter to said load line, and a regulating circuit coupled with said source and shunted across said resistance for applying thereto a voltage to directly effect regulation by the potential drop across said resistance, said regulating circuit being so coupled to the source that the voltage established thereby across said resistance is proportional to the source voltage.

GEORGE B. CROUSE.
JACOB L. JATLOW.